Figure 2:
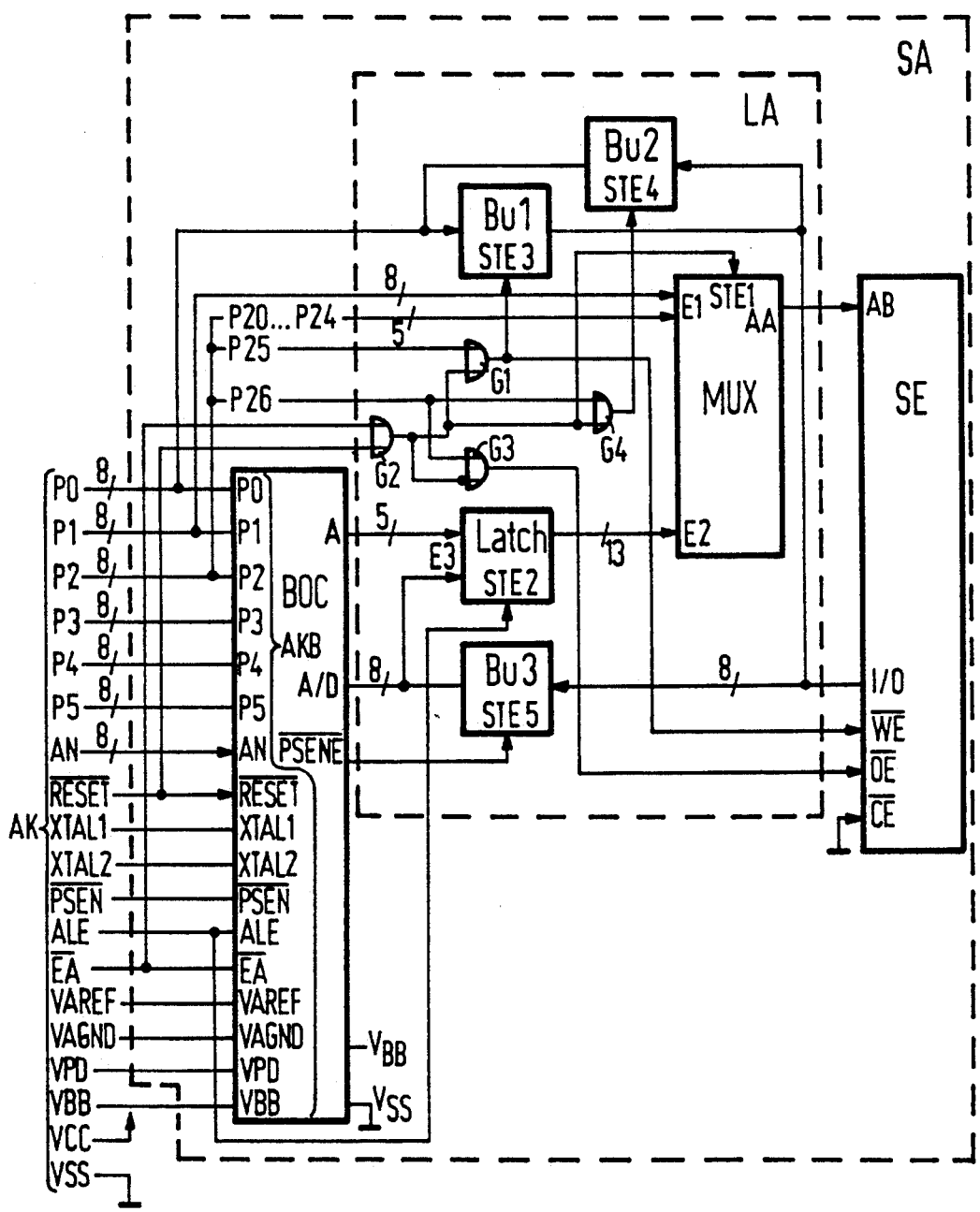

United States Patent [19]

Storandt et al.

[11] Patent Number: 5,307,285

[45] Date of Patent: Apr. 26, 1994

[54] CIRCUIT CONFIGURATION FOR EMULATING A MICROCONTROLLER

[75] Inventors: Steffen Storandt, Ottobrunn-Riemerling; Ralf-Johannes Lenninger, Regensburg, both of Fed. Rep. of Germany

[73] Assignee: Siemens Aktiengesellschaft, Munich, Fed. Rep. of Germany

[21] Appl. No.: 949,745

[22] Filed: Sep. 23, 1992

Related U.S. Application Data

[63] Continuation of Ser. No. 491,152, Mar. 9, 1990, abandoned.

[30] Foreign Application Priority Data

Mar. 9, 1989 [EP] European Pat. Off. ........ 89104192.3

[51] Int. Cl.⁵ ...................... G06F 13/00; G06F 12/00
[52] U.S. Cl. .................................... 364/489; 364/488; 364/578
[58] Field of Search ............... 364/488, 489, 490, 491, 364/578; 395/500

[56] References Cited

U.S. PATENT DOCUMENTS 5,062,034 10/1991 Bakker .............................. 364/200

OTHER PUBLICATIONS

Intel Data Sheet, No. 210,393-004, Oct. 1987; "UPItm-41,42: 8041AH/8741AH Universal Peripheral Interface 8-Bit Slave Microcontroller" p. 5-55, lines 6-13; p. 5-56, lines 11-12, 18-19; p. 5-59, col. 1; p. 5-59, col. 2, line 31-p. 5-61, col. 1, line 5; FIGS. 1-3, 7.
Intel Data Sheet, Advance Information, "8751BH Single-Chip 8-Bit Microcomputer with 4K Bytes of EPROM Program Memory" 6 pages.
Elektronik, vol. 25, Dec. 11, 1987, pp. 84-88; K. Brand: "Einchipcomputer und deren Entwicklung".
Siemens Product Information: SAB 80512K, "8-Bit Single-Chip Microcontroller ROM-less Version", Data Sheet 8.87 Preliminary.
IBM Technical Disclosure Bulletin, vol. 24, No. 6, Nov. 1981, p. 2952, New York, U.S.; S. E. Greer et al: "Top Surface Divider for Modules" lines 1-2.
Electrical Design News, vol. 26, No. 14, Jul. 22, 1981, pp. 212-224, Boston, Mass., U.S.; A. Santoni: "Instruments"; p. 220, col. 2, lines 7-42.

*Primary Examiner*—Vincent N. Trans
*Attorney, Agent, or Firm*—Herbert L. Lerner; Laurence A. Greenberg

[57] ABSTRACT

A circuit configuration for emulating a microcontroller includes connection terminals being pin-compatible with the microcontroller to be emulated. A bond-out chip of the microcontroller is connected to the connection terminals. A reprogrammable memory device is provided. A logic configuration provides direct access from at least some of the connection terminals to the reprogrammable memory device. The circuit configuration has a three-dimensional measurement being at least approximately identical to the three-dimensional measurement of the microcontroller to be emulated.

13 Claims, 3 Drawing Sheets

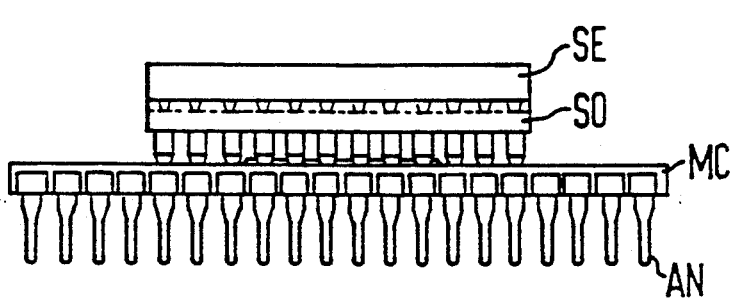
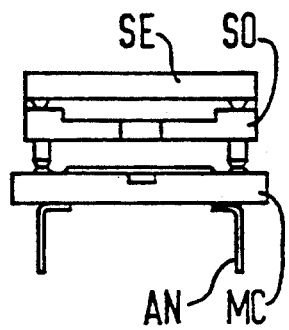
Fig. 1 a
Fig. 1 b
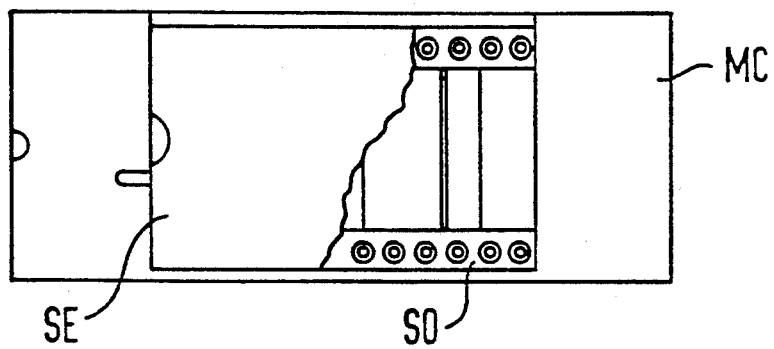
Fig. 1 c

CIRCUIT CONFIGURATION FOR EMULATING A MICROCONTROLLER

This application is a continuation of application Ser. No. 491,152, filed Mar. 9, 1990, now abandoned.

The invention relates to a circuit configuration for emulating a microcontroller, having connection terminals, a bond-out chip of the microcontroller, and a reprogrammable memory device connected thereto.

Microcontrollers are now well known. They can be used as large-scale integrated components, particularly for control tasks such as in anti-locking brake systems in motor vehicles. In such microcontrollers, a microprocessor, ports, data memories, program memories and possibly other special function devices are all integrated on a single chip. Type 8051 is one of the best known microcontrollers, which are also known as single-chip computers.

Today, customers can avail themselves of mask programmed microcontrollers or so-called ROM versions. That term is used for microcontrollers made by MOS technology, with an internal ROM as a memory device. However, that version is only suitable for products which are mass produced in large quantities. In the ROM version, the customer can no longer make any changes in the data in the memory, because the ROM is already mask programmed by the manufacturer. If the customer wishes to change the data in the microcontroller for any reason, such as because of modifications to the product in which the microcontroller is used, the customer is then forced to order a new mask programmed version from the microcontroller manufacturer. However, the production of a new mask programmed version of the microcontroller is comparatively time-consuming (requiring from several weeks to months), and is very expensive. ROM versions are accordingly unsuitable for prototypes and small-quantity manufacturing runs.

Manufacturers of such microcontroller chips also offer customers microcontrollers in an EPROM or EEPROM version, as is disclosed, for instance, in the journal Elektronik [Electronics], 1987, No. 25, pp. 84–88. Such microcontrollers can be programmed by the customer, using EPROM programming devices available on the market. If changes in the microcontroller program are necessary, the program memory in the EPROM version of the microcontroller can be erased with UV light and then reprogrammed. However, in contrast to the mask programmed microcontrollers, the EPROM or EEPROM version of the microcontroller requires a different chip construction and a completely different manufacturing technology.

Another option enabling the customer to reprogram the microcontroller memory is available in the piggyback version of microcontrollers, which is discussed more fully below. That term refers to a microcontroller chip that has an EPROM which is externally attachable in piggyback fashion, as its memory device. The primary disadvantage of such a circuit configuration is that because the microcontroller chip and the EPROM chip are stacked one on the other, the component occupies substantially more space than the microcontroller by itself. The EPROM chip must also be detached from the microcontroller during programming. The special housing that this requires makes for difficult manipulation.

Another development tool available to customers for developing, testing and modifying programs in microcontrollers is in the form of bond-out chips. That term is used for a version of the microcontroller in which the internal lines to the memory device, which are normally not accessible, are also provided with connections to the outside. The bond-out chip has no internal ROM memory. Instead, it includes additional connecting lines for an external memory. Connecting an EPROM or EEPROM as an external memory to the bond-out chip, for instance as shown on page 12 of Siemens Product Information "SAB 80 512 K, 8-Bit Single-Chip Microcontroller, ROM-less "version" Data Sheet 8.87, provides the customer with a development tool for a custom circuit with which the customer can change the program at any time. However, it is difficult and therefore annoying to the customer that the EPROM or EEPROM chip still has to be removed from the circuit configuration for programming. Still more disadvantageous is the fact that such a version is not identical, in either height or surface area, to the microcontroller component to be emulated.

It is accordingly an object of the invention to provide a circuit configuration for emulating a microcontroller, which overcomes the hereinafore-mentioned disadvantages of the heretofore-known devices of this general type, in which the program data thereof are variable, which does not need EPROM technology, and which moreover can be used as an integrated circuit configuration in a custom circuit like the known ROM version of the microcontroller component.

With the foregoing and other objects in view there is provided, in accordance with the invention, a circuit configuration for emulating a microcontroller, comprising connection terminals being pin-compatible with the microcontroller to be emulated, a bond-out chip of the microcontroller being connected to the connection terminals, a reprogrammable memory device, and a logic configuration providing direct access from at least some of the connection terminals to the reprogrammable memory device, the circuit configuration having a three-dimensional measurement being at least approximately identical to the three-dimensional measurement of the microcontroller to be emulated.

In accordance with another feature of the invention, the bond-out chip can be shifted into a passive state when direct access to the reprogrammable memory device is effected through the logic configuration.

In accordance with a further feature of the invention, one of the connection terminals controls internal access to an internal memory device in the microcontroller, and the one connection terminal is acted upon by a logical signal, which is equivalent to blocking the internal access to the internal memory device in the microcontroller to be emulated, during direct access to the reprogrammable memory device.

In accordance with an added feature of the invention, there is provided an adaptor device providing direct access to the memory device through the connection terminals.

In accordance with an additional feature of the invention, the logic configuration is activatable for direct access to the memory device by means of the adaptor device.

In accordance with yet another feature of the invention, the memory device is directly accessible for programming.

In accordance with yet a further feature of the invention, the memory device is directly accessible for reading data stored in the memory device.

In accordance with yet an added feature of the invention, at least one of the bond-out chip and the reprogrammable memory device are mounted along with the logic configuration without a housing on a mother board.

In accordance with yet an additional feature of the invention, the logic configuration is a custom or semi-custom circuit configuration.

In accordance with again another feature of the invention, the reprogrammable memory device is at least one EPROM chip or EEPROM chip.

In accordance with again a further feature of the invention, the connection terminals of the circuit configuration are disposed in the manner of a PLCC or DIP connection configuration.

In accordance with a concomitant feature of the invention, the logic configuration is integrated on the bond-out chip.

The essential advantage of the circuit configuration according to the invention is above all that the customer is provided with a chip that is identical, from the outside, to the mask programmed version of the microcontroller, so that it can be used in the customer's prototypes under operating conditions. In order to emulate the microcontroller, the user can use the circuit configuration according to the invention directly in the customer's custom circuit, attaching it to the connections provided for the microcontroller, without having to interpolate any intermediate plugs or adaptors. The customer has the option at any time of changing the program memory and monitoring it. For the manufacturer of large-scale integrated components, the particular advantage of the circuit configuration according to the invention is precisely that it no longer needs an EPROM or EEPROM version of the microcontroller or the associated dedicated EPROM or EEPROM technology for that particular microcontroller.

Other features which are considered as characteristic for the invention are set forth in the appended claims.

Although the invention is illustrated and described herein as embodied in a circuit configuration for emulating a microcontroller, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 3:
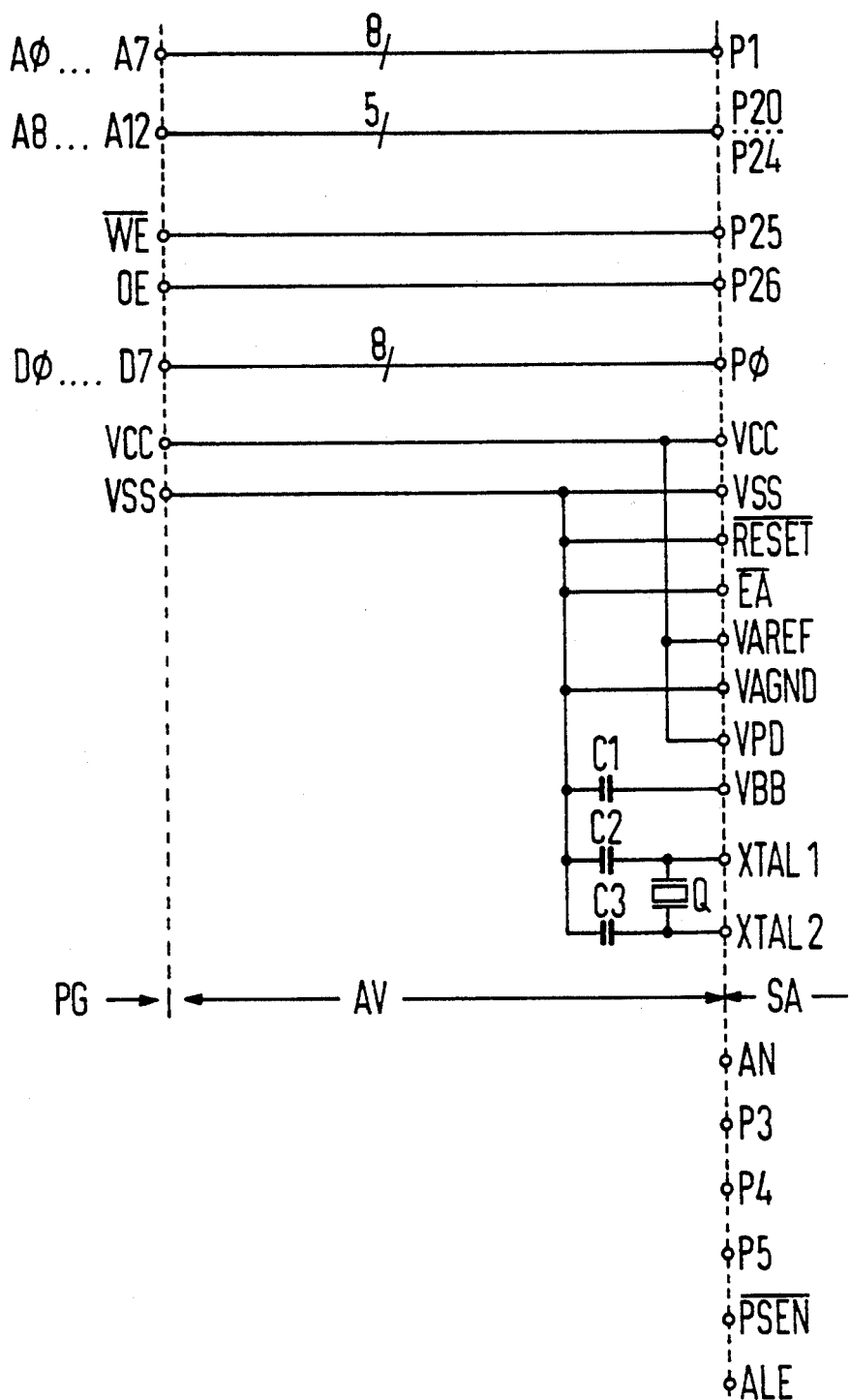

FIG. 1 includes a side-elevational, an end-elevational and a partly broken-away top-plan view of a piggyback version of a microcontroller of the prior art;

FIG. 2 is a schematic and block circuit diagram of an exemplary embodiment of a circuit configuration according to the invention for emulating a microcontroller; and FIG. 3 is a circuit diagram of an adaptor device for programming or reading of the reprogrammable memory device of the microcontroller.

Referring now to the figures of the drawings in detail and first, particularly, to FIG. 1 thereof, there is seen a piggyback version of a microcontroller MC of the kind available from the firm Siemens as Catalog No. SAB 80 315-C. The microcontroller MC has a so-called C-DIP 40 housing of the kind shown in FIG. 1, with 40 leads AN. When the microcontroller MC is inserted into a base SO and firmly connected to this component, a memory device SE, such as an EPROM or EEPROM, can be externally connected to the microcontroller MC. In order to program the EPROM or EEPROM component, it must be removed from the base SO and plugged into a conventional programming unit available on the market.

FIG. 2 shows a circuit configuration according to the invention of an exemplary embodiment for emulating a microcontroller, which in this case is the Siemens SAB 80 515 microcontroller. The circuit configuration is identified by the reference symbol SA. The circuit configuration SA which, for instance, has a PLCC or DIP pin configuration, has a bond-out chip BOC that fits the microcontroller to be emulated and is made by MOS technology, in this case is the Siemens component SAB 80 512 K. The bond-out chip BOC is described, for instance, in the above-mentioned Siemens Product Information "SAB 80 512 K, 8-Bit Single-Chip Microcontroller, ROM-less version" Data Sheet 8.87. The bond-out chip BOC is furnished by the manufacturer to the customer for real-time emulation in development in the custom circuit. In addition to having all of the leads present in the microcontroller to be emulated, the bond-out chip BOC also has connection terminals that do not extend to the outside and as a result are not accessible to the customer in the microcontroller itself. In the bond-out chip BOC of this exemplary embodiment, these are five terminals A for pure address lines, eight terminals A/D for address/data lines, all of which are necessary for access to the memory device, and a terminal PSENE, by way of which the program data stored in the external memory device are released to the eight A/D terminals of the address/data lines. As mentioned above, the remaining leads AKB of the bond-out chip BOC correspond to the leads of the mask programmed version of the microcontroller.

In the example shown, in addition to six leads for supply and reference voltages $V_{CC}$, $V_{SS}$, $V_{BB}$, $V_{PD}$, $V_{AGND}$ and $V_{AREF}$, the bond-out chip BOC also has the following connection terminals: six bidirectional 8-bit ports P0, P1, P2, P3, P4 and P5, one 8-bit unidirectional input port AN, a reset terminal RESET, two clock leads XTAL1, XTAL2, one terminal PSEN for program memory release, one further terminal ALE and a terminal EA, which must be applied to high potential to enable access to the internal ROM in the microcontroller to be emulated. At low potential or in other words at a logical L level, access to the internal ROM is blocked in the microcontroller to be emulated. The last-mentioned leads AKB of the bond-out chip BOC, totaling 68 in number, are also connected to connection leads AK of the circuit configuration SA according to the invention and represent the sole connection of the circuit configuration SA to the outside world, as is represented by the boundary drawn in dashed lines around the circuit configuration SA according to the invention shown in FIG. 2. The leads AK are constructed according to the invention in such a way that they are pin-compatible with the microcontroller to be emulated. As a result, the circuit configuration SA according to the invention can be inserted into the socket of the customer circuit provided for it, instead of the mask programmed version of the microcontroller. The housing of the circuit configuration SA according to the invention is suitably identical, or at least approximately identical, in its three-dimensional measurement, to the three-dimensional measurement of the microcontroller to be emulated.

A reprogrammable memory device SE, preferably an EPROM or EEPROM memory, is connected to the bond-out chip BOC, and its stored data can be erased by UV light or electrically, and reprogrammed. A logic configuration LA provides direct access to the memory device SE for programming or monitoring and for the associated read-out of the data stored in the memory device SE, over at least some of the connection terminals AK of the circuit configuration SA. For instance, the logic configuration may be a gate array circuit configuration. In the exemplary embodiment, the memory device SE is in the form of an 8K 8-bit EEPROM, for example type 28C64. If a low level or "L" is applied to the connection terminals EA and RESET, then access to the EEPROM can be gained through some of the external connection terminals AK. Otherwise, the bond-out chip BOC has access to the EEPROM.

Regarding further detail, the logic array LA in the illustrated exemplary embodiment includes a multiplexing device MUX having one control input STE1, 13 output terminals AA connected to address connection terminals AB of the memory device SE, and two 13-pole input terminals E1 and E2. The first input terminals E1 are at least partly connected to the connection terminals AK of the circuit configuration SA. In the illustrated exemplary embodiment, they are connected to the second 8-bit port P1 and the first five connection terminals P20-P24 of the third 8-bit port P2. The second input terminals E2 are connected to the output of a buffer storage device LATCH, having a control input STE2 and being provided with 13 input terminals, which are connected to the five address terminals A and the eight terminals A/D for the address/data lines A/D of the bond-out chip BOC. The control input STE2 of the buffer storage device LATCH is connected to the connection terminal ALE.

In the case of programming or monitoring, the addresses for the EPROM or EEPROM come from some of the connection terminals AK, and for normal operation from the bond-out chip BOC. This is assured by OR gates G1, G2, G3, G4 present in the logic configuration LA, which at logical "L" at the connection terminals EA and RESET pull the control input STE1 of the multiplexer device to the low level and thereby connect the terminals E1 of the multiplexing device MUX through to its output terminals AA.

Three 8-bit buffers, Bu 1, Bu 2, and Bu 3 control the data flow to and from the program memory.

The first 8-bit buffer Bu 1 switches the data present at the connection terminals P0 to the I/O connection terminal of the memory device SE. This mode of operation is necessary for programming and is established through the logic configuration LA whenever EA, RESET and P25 have a low level, causing the enable signal at the control terminal STE3 of the first buffer Bu 1 to become equal to "L". The second 8-bit buffer Bu 2 is disposed in such a way that the data of the memory device SE that are located on the I/O lines can be switched to the connection terminal P0. This mode of operation serves to monitor the programmed data and is called up by the logic configuration LA whenever the connection terminals EA, RESET and P26 are at the low level, so that the enable signal at the control terminal STE4 of the second buffer Bu 2 is equal to "L".

The third 8-bit buffer Bu 3 switches the data from the I/O lines of the memory device SE to the terminals A/D of the address/data lines of the bond-out chip BOC. This mode of operation is required in the normal situation. The enable signal at the control terminal STE5 comes from the output of the connection terminal PSENE of the bond-out chip BOC.

The terminal CE is constantly active or in other words at logical "L" from the control lines for the memory device SE. The write signal at the terminal WE for programming the memory device SE becomes active through the logic configuration LA when EA, RESET and P25 equal "L". The read signal at the terminal OE is active both in normal operation and in the monitoring mode.

The selection as to whether the circuit configuration SA according to the invention will function as a microcontroller, or whether the memory device SE is to be programmed, is effected in the present circuit configuration SA by the application of a logical level "H" or "L" to the terminals EA and RESET. This is no hindrance for the user, because access to the memory device SE is needed only when the circuit configuration SA is not operating as a microcontroller. If at least one of the connection terminals EA or RESET is at logical "H", then the bond-out chip BOC outputs the address for the program memory access in multiplexed form through its connection terminals A and A/D. The buffer storage device LATCH controls this address, by means of the signal present at the terminal ALE, and this address then reaches the memory device SE through the multiplexer MUX. The associated data are entered through the buffer device Bu 3 with the signal at the connection terminal PSENE. Since the terminal CE is constantly applied to reference potential, while WE is applied to positive potential, the read signal of the memory device SE is active, and the write signal is blocked.

In contrast, if the input terminals EA and RESET are at logical "L", then direct access to the EEPROM is possible through at least some of the connection terminals AK of the circuit configuration SA, in this case through the ports P0, P1 and P2. The addresses are imparted to the EEPROM through the connection terminals P10-P17 and P20-P24 and the multiplexer device MUX. The data for the EEPROM flow through the 8-bit port P0 and the 8-bit buffer Bu 1 to the input terminals I/O of the EEPROM. The control signal for writing or programming must be applied to the connection terminal P25, while the control signal for reading and thus monitoring must be applied to the connection terminal P26. At the memory device SE, either the write signal WE or the read signal OE is then active.

In order to assure that the bond-out chip BOC will behave passively and thus with high impedance with respect to the connection terminals P0, P1 and P2 in the programming or monitoring mode, it is also necessary to shift these elements to the reset state. One condition (RESET="L") for this has already been met, as has been explained above. In addition, a resonator, advantageously a ceramic oscillator, must be connected to the terminal XTAL1 and XTAL2.

A practical configuration for programming or monitoring of the memory device SE is formed of a conventional programming unit, which is available on the market for the component of the memory device SE being used, and an adaptor device. On one hand, an adaptor device AV, as shown for instance in FIG. 3, makes the connection between the different connection configurations of the programming unit PG and the connection terminals AK of the microcontroller to be emulated and therefore of the circuit configuration SA which is shown. Additionally, with the adaptor device AV, certain connection terminals of the circuit configuration SA of the invention are applied to fixed values, particularly RESET and EA="L", and a resonator Q is also connected.

On the programming unit side, the adaptor device AV has connection terminals APG for the addresses A0-A12, the write signal WE, the read signal OE, and data D0-D7. The current supply, $V_{CC}$ and $V_{SS}$, must also be connected to two connection terminals APG.

In the circuit configuration SA of the invention itself, the aforementioned connection terminals AK are provided and connected to the connection terminals APG in the manner shown in FIG. 3. The connection terminals AN, P3, P4, P5, PSEN and ALE remain unoccupied. The resonator Q is incorporated between the terminals XTAL1 and XTAL2. The terminals $V_{BB}$, XTAL1, XTAL2 are also connected through capacitors C1, C2, C3 to the terminal $V_{SS}$ for reference potential.

The circuit configuration according to the invention can advantageously be constructed in such a way that the bond-out chip BOC and the memory device SE are disposed as a housingless chip on a mother board, and the additional logic configuration LA is made as a custom or semi-custom circuit, for instance as a gate array circuit.

With the circuit configuration according to the invention, the customer is furnished with a quasi-EPROM version of a microcontroller that is virtually indistinguishable from a mask programmed microcontroller, from the outside. However, this emulated microcontroller has a reprogrammable memory that can be varied at any time by the customer. By combining MOS technology for the bond-out chip BOC and EEPROM technology for the memory device in accordance with the invention, the complicated manufacture of microcontrollers in an EPROM version becomes unnecessary. The logic configuration LA can also be integrated on the bond-out chip BOC.

We claim:

1. Reprogrammable microcontroller, comprising connection terminals, a bond-out chip connected to said connection terminals, a reprogrammable memory device being programmable through said connection terminals, and a logic configuration connected to at least some of said connection terminals and providing direct access from at least some of said connection terminals to said reprogrammable memory device, said logic configuration including means for effecting direct access from said connection terminals to said reprogrammable memory device and for shifting said bond-out chip into a passive state in response to a given logic signal applied to at least one of said connection terminals, and said logic configuration including means for causing the reprogrammable microcontroller to be inaccessible for programming through said terminals and to emulate a ROM-type microcontroller when said given logic signal is not applied to said at least one connection terminal.

2. Circuit configuration according to claim 1, including an adaptor device providing direct access to said memory device through said connection terminals.

3. Circuit configuration according to claim 2, wherein said logic configuration is activatable for direct access to said memory device by means of said adaptor device.

4. Circuit configuration according to claim 1, wherein said memory device is directly accessible for programming.

5. Circuit configuration according to claim 1, wherein said memory device is directly accessible for reading data stored in said memory device.

6. Circuit configuration according to claim 1, wherein at least one of said bond-out chip and said reprogrammable memory device are mounted along with said logic configuration without a housing on a mother board.

7. Circuit configuration according to claim 1, wherein said logic configuration is a custom circuit configuration.

8. Circuit configuration according to claim 1, wherein said logic configuration is a semi-custom circuit configuration.

9. Circuit configuration according to claim 1, wherein said reprogrammable memory device is at least one EPROM chip.

10. Circuit configuration according to claim 1, wherein said reprogrammable memory device is at least one EEPROM chip.

11. Circuit configuration according to claim 1, wherein said connection terminals of said circuit configuration are disposed in the manner of a PLCC connection configuration.

12. Circuit configuration according to claim 1, wherein said connection terminals of said circuit configuration are disposed in the manner of a DIP connection configuration.

13. Circuit configuration according to claim 1, wherein said logic configuration is integrated on said bond-out chip.

* * * * *